(No Model.)

C. D. BURK.
SHAFT COUPLING.

No. 391,508. Patented Oct. 23, 1888.

Witnesses.
Aby. Barkoff.
David S. Williams.

Inventor:
Charles D. Burk.
By his Attorneys
Howson and Sons.

UNITED STATES PATENT OFFICE.

CHARLES D. BURK, OF PHILADELPHIA, PENNSYLVANIA.

SHAFT-COUPLING.

SPECIFICATION forming part of Letters Patent No. 391,508, dated October 23, 1888.

Application filed July 25, 1887. Serial No. 245,221. (No model.)

*To all whom it may concern:*

Be it known that I, CHARLES DAVID BURK, a citizen of the United States, and a resident of Philadelphia, Pennsylvania, have invented certain Improvements in Shaft-Couplings, &c., of which the following is a specification.

The object of my invention is to so construct a device for coupling shafts or securing wheels or pulleys to shafts that no special preparation of the shaft or shafts will be required, the device, moreover, comprising but few parts, of a cheap and simple character.

Figure 1:
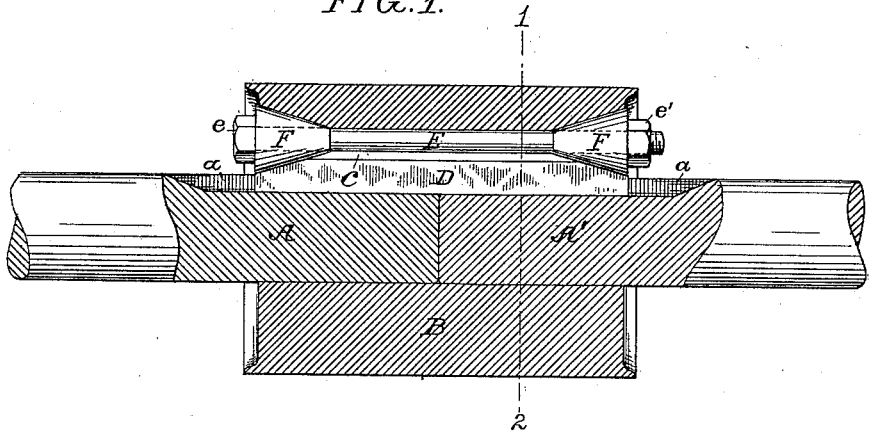
Figure 2:
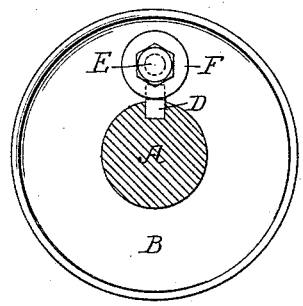
Figure 3:
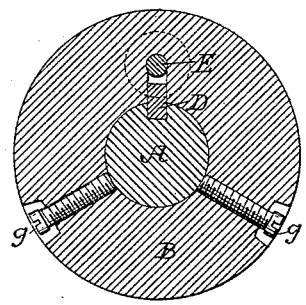
Figure 4:
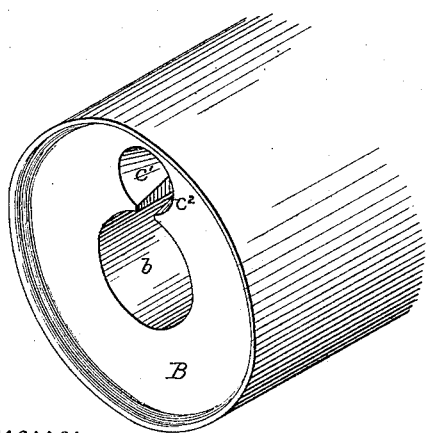
Figure 5:
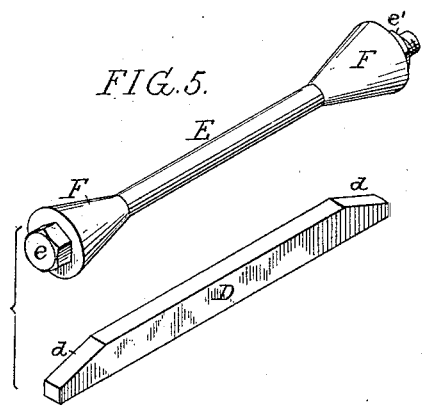

In the accompanying drawings, Figure 1 is a longitudinal section of the device employed as a shaft-coupling. Fig. 2 is an end view. Fig. 3 is a transverse section on the line 1 2, Fig. 1; and Figs. 4 and 5 are detached perspective views of parts of the coupling.

A A' are two shafts to be coupled, these shafts having at the adjoining ends the usual keyways, $a$, for the reception of a loose key, D.

B is the sleeve of the coupling, which is bored out for the reception of the ends of the shafts A A', and has at one side of the central bore, $b$, a longitudinal opening, $c$, having a tapering enlargement, $c'$, at each end and communicating with the central bore through a slot, $c^2$, which receives the key D, the latter being tapered at the ends for the action of cone-blocks F, carried by a bolt, E, which is contained in the longitudinal opening $c$ in the sleeve, one end of the bolt having a head, $e$, forming a bearing for one cone-block, and the other end of the bolt being threaded for the reception of a nut, $e'$, which bears upon the opposite cone-block.

In effecting the coupling the ends of the shafts are inserted into the bore $b$ of the sleeve and the key D slipped into its place in the keyways $a$ and slot $c^2$, the tapered ends of the keys projecting slightly into the tapered ends $c'$ of the opening $c$. The bolt E, with its head-block F, is then inserted until said block enters its opening $c'$ at one end of the sleeve, the other cone-block being then slipped over the other end of the bolt and into the opposite opening, $c'$, and the nut $e'$ then applied and screwed up, so as to cause the cone-blocks to bear forcibly upon the opposite tapered ends of the key D and press the same firmly into the keyways of the shafts.

Screws $g$ $g$ may be provided for centering the shafts in respect to the sleeve when desired.

It will be seen that no special preparation of the shafts other than the usual key-seating of the same is required in order to adapt them for coupling, and the parts of the coupling are both few and simple, so that a very cheap coupling is produced.

It will be evident that the device may be used as a means of securing a wheel or pulley to a shaft, the hub of the wheel in this case taking the place of the sleeve B.

I claim as my invention—

The combination of a shaft or shafts having a keyway therein, a key adapted thereto, and a sleeve or hub having a bolt with cone-blocks bearing upon the key at its opposite ends, all substantially as specified.

In testimony whereof I have signed my name to this specification in the presence of two subscribing witnesses.

CHARLES D. BURK.

Witnesses:
JOHN T. LEWIS,
HARRY SMITH.